UNITED STATES PATENT OFFICE 2,624,731

5-PHENYLPYRIMIDINE DERIVATIVES

George H. Hitchings, Tuckahoe, and Peter B. Russell, Crestwood, N. Y., assignors to Burroughs Wellcome & Co. (U. S. A.) Inc., Tuckahoe, N. Y., a corporation of New York No Drawing. Application February 15, 1950, Serial No. 144,394

6 Claims. (Cl. 260—256.4)

The present invention is concerned with the discovery that certain 2,4-diamino-5-phenylpyrimidines have valuable properties for certain therapeutic applications. The new derivatives have characteristics which are found to resemble the activities of the related 5-substituted 2,4-diaminopyrimidines described in our cognate applications Nos. 74,462 and 134,866, but for certain applications have considerably greater potency and are hence more valuable for these properties. For example, on the basis of tests with the malarial organism, Plasmodium berghei in mice, these compounds have been found to have outstanding chemotherapeutic activity which is many times that of any of the standard antimalarials now available commercially.

In accordance with the present invention the new compositions may be represented as substituted pyrimidines of the formula:

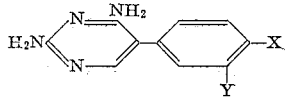

wherein X is selected from the class consisting of hydrogen, halogen, the nitro, amino and acylamido radicals and Y is selected from the class consisting of halogen and hydrogen.

The compounds of the present invention may be prepared by the initial formation of an appropriate alpha-formylphenylacetic acid ester and the condensation of this compound with guanidine to give the 2-amino-4-hydroxy-5-phenylpyrimidine. This latter compound may then be chlorinated and aminated to form the desired 2,4-diaminopyrimidine derivative.

The new derivatives may likewise be prepared by a number of alternative procedures which have proven advantageous in certain instances, although the systematic synthesis outlined above, is usually preferred. An alternative method of preparing the new compounds is by the thiation of 5-phenyluracil, 2-thiouracil, 2-ethylmercapto-4-hydroxypyrimidine or the 2-amino-4-hydroxypyrimidines by the method of Hitchings and Elion described in U. S. Patent No. 2,415,793 to form the 2,4-dithiol or 2-amino-4-thiolpyrimidine. The latter compound may then be converted into the corresponding 2,4-diaminopyrimidine by amination as exemplified in the pending applications of Hitchings, Russell, and Falco No. 74,462 and Hitchings and Russell Nos. 33,677 and 48,528.

A further alternative method for the formation of the compounds of the present invention is by the condensation of an alpha-formylphenyl- acetonitrile with guanidine. This is preferably accomplished by first converting an alpha-formylphenylacetonitrile to its enol ether

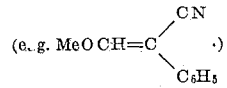

by treatment with diazomethane. The enol ether is then condensed with guanidine. The following examples serve to illustrate preferred methods used in preparing the composition of the present invention but are in no way intended to limit the invention, the scope of which is defined in the claims.

EXAMPLE 1

*2,4-diamino-5-phenylpyrimidine*

To sodium wire (11.5 g. 0.5 mol.) under dry ether (200 ml.) was added slowly ethylphenylacetate (82 g., 0.5M) and ethyl formate (37 g., 0.6M). The reaction proceeded slowly. After standing overnight a solution of guanidine (from 47.7 gms. (0.5 mol.) of the hydrochloride and 11.5 g. of sodium) in ethanol (250 ml.) was added and the solution refluxed after standing for 5 hours. Refluxing was continued for 6 hours and the mixture then poured into 1 liter of water. The aqueous solution was acidified with acetic acid. On standing a white solid crystallized. This after recrystallization from ethanol melted at 244°–247°.

The hydroxyaminopyrimidine (5 g.) was refluxed with phosphorus oxychloride for 2 hours. The excess oxychloride was evaporated and the syrup poured onto ice (250 g.). The whole was basified with strong ammonium hydroxide, the temperature being kept at 0°–10° C. by addition of ice. After standing for one hour the crude chlorocompound was filtered off. It was then treated in a sealed bomb at 130–145° with 200 ml. of ethanol, saturated at 0° with ammonia; the mixture was heated 16 hours. The bomb was then cooled and opened. The excess ammonia and ethanol were evaporated. The residue was treated with strong sodium hydroxide solution and the insoluble material filtered and washed with cold water. On recrystallization from water it formed colorless needles M. P. 163°–164°.

EXAMPLE 2

*2,4-diamino-5-p-chlorophenylpyrimidine*

Thirty-nine and six-tenths grams of ethyl-p-chlorophenylacetate and 14.8 g. of ethyl formate in 50 ml. of ether were added to a suspension of freshly prepared dry sodium ethoxide (from 4.6 gms. sodium) in 50 ml. dry ether. The flask was stoppered and allowed to stand at room temperature for three days. At the end of this time guanidine (from 19.2 gms. hydrochloride and 4.6 gms. sodium) in 100 ml. alcohol was added and the flask allowed to stand overnight and then refluxed for 6 hours. The solution was then poured into 500 ml. of water and the solution acidified. The solid material was washed with ether, and recrystallized from aqueous ethanol, M. P. 323 with decomposition, softens at 287°.

The above aminohydroxypyrimidine (19 g.) was heated with 150 ml. of phosphorus oxychloride under reflux until solution was complete. The excess phosphorus oxychloride was distilled off and the residue poured onto 500 gms. ice (with the aid of a little acetone). The ice was stirred and made alkaline with strong ammonia. After about 1 hour the crude chlorocompound was filtered off. It was heated with 250 ml. of a solution of ammonia in ethanol (saturated at 0°–5°) in a bomb at 150°–160° for 16 hours. The product was worked up as in the previous experiment; M. P. 187°–190°, after recrystallizing from aqueous ethanol.

EXAMPLE 3

*2,4-diamino-5-p-bromophenylpyrimidine*

The 2-amino-4-hydroxy-5-p-bromophenylpyrimidine was prepared from the ester 40 g., ethylformate 12.2 g., sodium 3.8 g., and guanidine from 16 g. of hydrochloride as for the 2-amino-4-hydroxy-5-phenylpyrimidine. The compound was recrystallized from ethanol and melted at 313° (dec.).

The hydroxyamino compound 5 g., was chlorinated in the usual manner and the chlorocompound treated with ammonia to give the diamino compound, needles from aqueous ethanol, M. P. 205–207°.

EXAMPLE 4

*2,4-diamino-5-(3'4'dichlorophenyl)-pyrimidine*

The 2-amino-4-hydroxy-5-(3'4'dichlorophenyl)-pyrimidine was prepared from the corresponding ethylphenylacetate 32 g., sodium ethoxide (from 3.2 g. sodium) ethylformate and guanidine as described for the 5-p-chlorophenyl compound. The compound was purified by recrystallization from aqueous ethanol.

The aminohydroxy compound, 4 g., was chlorinated and aminated as previously described, the diamino compound formed colorless plates from alcohol-water, M. P. 208–210.

EXAMPLE 5

*2,4-diamino-5-m-chlorophenylpyrimidine*

The hydroxyaminopyrimidine was prepared from ethyl-m-chlorophenylacetate as described for the p-chlorocompound. It crystallized from aqueous alcohol as prisms, M. P. 255°–253°. The aminohydroxy compound was chlorinated and aminated as previously described to give 2,4-diamino-5-m-chlorophenylpyrimidine, as plates, M. P. 198–200°, from water.

EXAMPLE 6

*2,4-diamino-5-m-bromophenylpyrimidine*

This compound was prepared in exactly the same manner as the m-chloro-compound as in Example 5.

EXAMPLE 7

*2,4-diamino-5-p-nitrophenylpyrimidine*

The 2-amino-4-hydroxy-5-phenylpyrimidine described above in Example 1, was nitrated in the usual manner with acetic acid-nitric acid mixture at 50–60°, giving the 2-amino-4-hydroxy-5-p-nitrophenylpyrimidine. Chlorination and amination of this, as in the above examples, gave 2,4-diamino-5-p-nitrophenylpyrimidine as plates from water, M. P. 315–317°.

EXAMPLE 8

*2,4-diamino-5-p-aminophenylpyrimidine*

The 2,4-diamino-5-p-nitrophenylpyrimidine as in Example 7, was reduced catalytically at room temperature and 2–3 atmospheres pressure of hydrogen, using Raney nickle catalyst, giving 2,4-diamino-5-p-aminophenylpyrimidine.

EXAMPLE 9

*2,4-diamino-5-p-acetamidophenylpyrimidine*

The 2-amino-4-hydroxy-5-p-nitrophenylpyrimidine above, in Example 7, was reduced catalytically as in the previous example to 2-amino-4-hydroxy-5-p-amino-phenylpyrimidine. The latter on acetylation gave 2-amino-4-hydroxy-5-p-acetamidophenylpyrimidine, which was chlorinated and aminated in the usual way. The resulting 2,4-diamino-5-p-acetamidophenylpyrimidine crystallized as platelets from aqueous ethanol.

EXAMPLE 10

*2,4-diamino-5-phenylpyrimidine*

2-ethylmercapto-4-hydroxy-5-phenylpyrimidine was prepared by the condensation of ethyl-beta-phenyl-alpha-formyl-acetate and ethylpseudothiourea bromide with sodium methylate in methanolic solution. 5 g. of the mercapto compound was treated with 15 g. of phosphorus pentasulfide in 50 ml. of tetralin at 170° for two hours giving 3 g. of the yellow 5-phenyl-2,4-dithiol-pyrimidine. The 3 g. of phenyldithiolpyrimidine was heated in a sealed tube with 30 ml. of concentrated ammonium hydroxide solution at 100° for 16 hours, and, after cooling, the contents of the bomb was evaporated to dryness and extracted with diluted ammonium hydroxide, giving 1.9 g. of 4-amino-5-phenyl-2-thiolpyrimidine. The above compound (1.9 g., 9.4 mM) was boiled in aqueous solution with 1.0 g. (10.5 mM) of chloroacetic acid. On cooling the 4-amino-2-carboxymethylthio-5-phenylpyrimidine separated in prismatic form (1.95 g.). The carboxymethylthio derivative above was heated with 20 ml. of concentrated ammonium hydroxide solution at 140–150° for 17 hours. The contents of the bomb was evaporated to dryness and the residue recrystallized from water. There was obtained 1.1 g. of 2,4-diamino-5-phenylpyrimidine, identical with that prepared as in Example 1.

EXAMPLE 11

*2,4-diamino-5-phenylpyrimidine*

Phenylformylacetonitrile was converted to methoxymethylenephenylacetonitrile by treatment with 1 molecular proportion of diazomethane in ether. The oily methoxymethylene compound was treated with 1 mol of guanidine in alcohol. A reaction took place at once. The mixture was heated on a steam bath for two hours, the alcohol was removed and then a strong sodium hydroxide solution was added. The crystalline solid was filtered: it was identical with 2,4-diamino-5-phenylpyrimidine prepared by the methods of Example 1 and Example 10 above.

The non-toxic salts are to be regarded as the equivalent of the uncombined bases described herein since the base is the physiologically active component and the activity is unaffected by the nature of the salt.

We claim:

1. As a new compound a 2,4-diaminopyrimidine having the following formula:

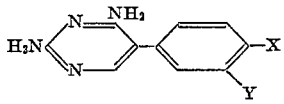

wherein X is selected from the group consisting of hydrogen, halogen, nitro, amino and acylamido, and Y is selected from the group consisting of hydrogen, chlorine and bromine.

2. 2,4-diamino-5-p-chlorophenylpyrimidine.
3. 2,4-diamino-5-p-bromophenylpyrimidine.
4. 2,4-diamino - 5 - (3',4'-dichlorophenyl)-pyrimidine.
5. 2,4-diamino-5-p-nitrophenylpyrimidine.
6. 2,4-diamino-5-phenylpyrimidine.

GEORGE H. HITCHINGS.
PETER B. RUSSELL.

REFERENCES CITED

The following references are of record in the file of this patent:

UNITED STATES PATENTS

| Number | Name | Date |
|---|---|---|
| 2,211,710 | Zerweck et al. | Aug. 13, 1940 |